(No Model.)
J. C. SCHELLENBAUM.
LUBRICATOR.
No. 372,708. Patented Nov. 8, 1887.
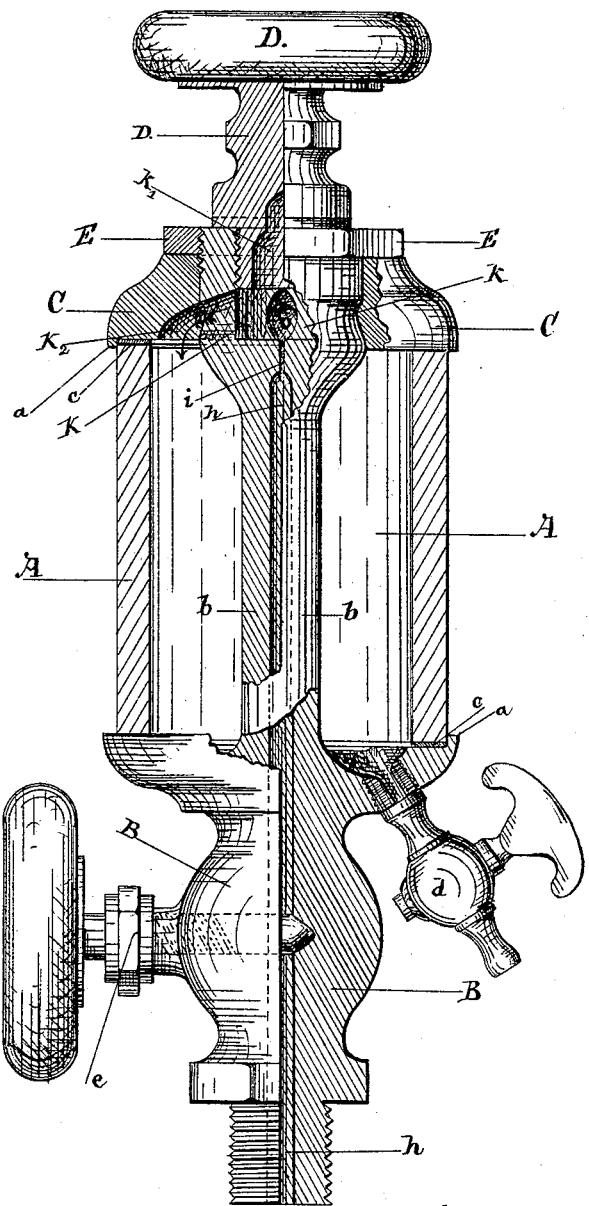
Witnesses:
A. Ohlhoff.
W. G. Homberg
Inventor:
John C. Schellenbaum

United States Patent Office.

JOHN C. SCHELLENBAUM, OF PORTLAND, OREGON.

LUBRICATOR.

SPECIFICATION forming part of Letters Patent No. 372,708, dated November 8, 1887.

Application filed July 9, 1887. Serial No. 243,908. (No model.)

*To all whom it may concern:*

Be it known that I, JOHN C. SCHELLENBAUM, a citizen of the United States, residing at Portland, in the county of Multnomah and State of Oregon, have invented certain new and useful Improvements in Lubricators for Steam-Cylinders, of which the following is a specification, reference being had therein to the accompanying drawing.

My invention relates to facilitating and economizing in lubricating steam reservoirs, cylinders, or chests, and other steam-condensers, as the improvements consist of novel arrangements, allowing the oil or grease to find its way to the parts to be oiled by the force of water which forms in the cup by the condensation of the steam entering the cup.

In the accompanying drawing I show a sectional view of a lubricating-cup which fully illustrates my invention.

A is a glass tube forming the body and the oil-reservoir, and on account of being of glass a much easier control is gained by the person in charge as to whether a refilling is required or not. This glass tube A rests in the lower part, B, which also forms the connection part with the steam pipe or chest, whereas the top piece, C, is used as the cover of glass tube A, and resting on the same. The glass tube A may be protected, if necessary, by wires or wire-netting as an outside cover. The nut E, which is screwed onto the upright stem $b$ of lower part, B, firmly secures and fastens the different parts of the construction together. The plug D screws into the upright stem $b$, thus closing the cup "steam-tight." The lower part, B, and top piece, C, have flanges or shoulders $a$, to keep glass tube A and packing-rings $c$ in their respective places. The lower part, B, with its upright stem $b$, is made out of one piece, having a drain-cock, $d$, and a steam-regulating valve, $e$, attached thereto. A channel, $h$, is drilled through lower part, B, and upright stem $b$ large enough to allow the steam to enter through the smaller channel, $i$, into condensing-chamber $k$ of upright stem $b$ and into condensing-chamber $k'$ of plug D, from where the steam enters by means of holes $o$, drilled through top of upright stem $b$, into the hollowed part $k^2$ of top piece, C, and thence into the glass tube or reservoir A.

I am aware that prior to my invention lubricators of similar construction have been in use. I therefore do not claim such a combination, broadly; but What I do claim as my invention, and desire to secure by Letters Patent, is—

In a lubricator, the combination, with the lower part, B, having formed integral therewith the upright $b$, provided with channel $h$, channel $i$, and condensing-chamber $k$, and the glass body A, supported by said lower part of the top piece, C, having a chamber, $k^2$, and the plug D, having the chamber $k'$ communicating with the chambers $k^2$ and $k$, substantially as and for the purpose specified.

JOHN C. SCHELLENBAUM.

Witnesses:
 A. OHLHOFF,
 W. G. HOMBERG.